3,448,082
DICYCLOPENTADIENYLIRON-PHTHALALDE-
HYDE CONDENSATION PRODUCT
Joseph J. McGrath and Ilgvars J. Spilners, Monroeville,
Pa., assignors to Gulf Research & Development Company, Pittsburgh, Pa., a corporation of Delaware
No Drawing. Filed Sept. 20, 1966, Ser. No. 580,619
Int. Cl. C08g 13/00
U.S. Cl. 260—67                        8 Claims

ABSTRACT OF THE DISCLOSURE

Cross-linked condensation products which are pressure-moldable are obtained by condensing a dicyclopentadienyliron compound and a phthalaldehyde at about 100° to about 200° C. in the presence of an acidic condensing agent. Ferrocene, alkyl ferrocenes and aralkyl ferrocenes are exemplary of the dicyclopentadienyliron compounds. Phthalaldehyde, isophthalaldehyde, terephthalaldehyde and their alkyl derivatives are exemplary of the phthalaldehydes.

---

This invention relates to novel dicyclopentadienyliron derivatives which are pressure-moldable and are useful in the preparation of heat stable and semi-conductive plastics.

The dicyclopentadienyliron derivatives of the present invention are polymers obtained by condensing (1) a dicyclopentadienyliron compound having the formula $(C_5H_{5-n}R_n)Fe(C_5H_{5-n}R'_n)$ in which $C_5H_{5-n}$ is a cyclopentadienyl radical, R and R' are selected from the group consisting of hydrogen, alkyl and aralkyl radicals containing 1 to 8 carbon atoms and $n$ is an integer of 0 to 4 and (2) a phthalaldehyde having the formula

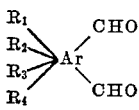

where Ar is an aromatic $C_6$ ring and $R_1$, $R_2$, $R_3$ and $R_4$ are selected from the group consisting of hydrogen and alkyl radicals containing 1 to 12 carbon atoms. The R, R', $R_1$, $R_2$, $R_3$ and $R_4$ substituents in the above formulas may be either the same or different substituents. For example, they all may be hydrogen; they all may be the same or different alkyl radicals, provided there is no appreciable steric hindrance; or some of the substituents may be hydrogen and the remainder like or unlike alkyl radicals. When $R_1$, $R_2$, $R_3$ and $R_4$ in the phthalaldehyde compound are all alkyl radicals, steric hindrance may result if the alkyl groups attached to adjacent carbon atoms in the aromatic $C_6$ ring are tertiary alkyl groups such as tertiary butyl radicals. For this reason, the phthalaldehyde compound is preferably one which does not contain tertiary alkyl groups on adjacent carbon atoms in the aromatic $C_6$ ring. Subject to this limitation, the alkyl substituents represented by the various R's in the above formulas include methyl, ethyl, propyl, isopropyl, butyl, isobutyl, tertiary butyl, amyl, isoamyl, hexyl, isohexyl, heptyl, octyl, isooctyl, nonyl, decyl, undecyl, dodecyl radicals and the like.

A specific example of a dicyclopentadienyliron compound having the formula $(C_5H_{5-n}R_n)Fe(C_5H_{5-n}R'_n)$ where R and R' are hydrogen and $n$ is 1 is dicyclopentadienyliron, more commonly known as "ferrocene". Since dicyclopentadienyliron is known to the art as "ferrocene," the alkyl derivatives which we employ can be regarded as mono-, di-, tri-, tetra-, penta- and higher alkylferrocenes. Specific examples of some of the alkyl and aralkyl ferrocenes are:

methylferrocene
ethylferrocene
n-propylferrocene
isopropylferrocene
n-butylferrocene
isobutylferrocene
tertiary-butylferrocene
n-amylferrocene
isohexylferrocene
n-heptylferrocene
isooctylferrocene
1,1'-dimethylferrocene
1,1'-diethylferrocene
1,1'-di-n-propylferrocene
1,1'-diisopropylferrocene
1,1'-di-n-butylferrocene
1,1'-diisobutylferrocene
1,1'-di-tertiary-butylferrocene
1,1'-di-n-amylferrocene
1,1'-diisohexylferrocene
1,1'-di-n-heptylferrocene
1,1'-di-(1,1,3,3-tetramethylbutyl)ferrocene
1,2-dimethylferrocene
1,3-dimethylferrocene
1,2,3-trimethylferrocene
1,2,1'-trimethylferrocene
1,2,3,4-tetramethylferrocene
1,2,3,1'-tetramethylferrocene
1,2,1',2'-tetramethylferrocene
1,2,1',3'-tetramethylferrocene
1,2,3,1',2'-pentamethylferrocene
1,2,3,4,1'-pentamethylferrocene
1,2-diethylferrocene
1,2-di-n-propylferrocene
1,2-diisobutylferrocene
1,2-di-n-amylferrocene
1,2-diisohexylferrocene
1,2-di-n-heptylferrocene
1,2-diisooctylferrocene
1,3-diethylferrocene
1,3-di-n-propylferrocene
1,3-diisobutylferrocene
1,3-di-n-amylferrocene
1,3-diisohexylferrocene
1,3-di-n-heptylferrocene
1,3-diisoctylferrocene
1,1'-methylethylferrocene
1,1'-methylpropylferrocene
1,1'-methylbutylferrocene
1,1'-methylhexylferrocene
1,1'-methylisooctylferrocene
1,2-methylethylferrocene
1,2-methylpropylferrocene
1,2-methylbutylferrocene
1,2-methylhexylferrocene
1,2-methylisooctylferrocene
1,3-methylethylferrocene
1,3-methylpropylferrocene 1,3-methylbutylferrocene
1,3-methylhexylferrocene
1,3-methylisooctylferrocene
1,1'-ethylpropylferrocene
1,1'-propylbutylferrocene
1,2-butylisoamylferrocene
1,3-isoamylhexylferrocene
1,1'-isohexylheptylferrocene
1,1'-heptylisooctylferrocene
1,1'-isooctyl-tertiary butylferrocene
benzylferrocene
1,1'-dibenzylferrocene The dicyclopentadienyliron compound employed as a starting material in preparing the dicyclopentadienyliron derivatives of the invention can be prepared in various ways. Neither the dicyclopentadienyliron compound nor its method of preparation constitutes any portion of the invention inasmuch as ferrocene and alkyl derivatives of ferrocene and their preparation are disclosed in the literature. Ferrocene for example can be prepared by passing a mixture of cyclopentadiene and nitrogen over a reduced iron catalyst at 300° C. This method however requires frequent reactivation of the catalyst. This method is reported by S. A. Miller, J. A. Tebboth and J. F. Tremaine in the Journal of the Chemical Society, 632, February 1952. Another method involves reaction of ferrous chloride with cyclopentadiene and diethylamine to give ferrocene. (Organic Syntheses, volume, 36, page 34, 1956. A third method of preparing ferrocene comprises a Grignard synthesis starting with cyclopentadiene ethyl magnesium bromide and ferric chloride; this method for preparing ferrocene is disclosed by T. J. Kealy and P. L. Pauson in Nature, volume 168, page 1039 (1951). Alkyl ferrocenes can be similarly prepared by starting with the desired alkyl cyclopentadiene as disclosed in the copending application of Donald R. Stevens and Ronald L. Sweet, Ser. No. 283,513, filed Apr. 21, 1952, now U.S. Patent No. 3,294,685, dated Dec. 27, 1966. Aralkyl ferrocenes are similarly prepared by starting with the desired aralkyl cyclopentadiene.

The phthalaldehyde compound employed as a starting material in preparing the dicyclopentadienyliron derivatives of the invention can be prepared in various ways. Neither the phthalaldehyde compound nor its method of preparations constitutes any portion of the invention inasmuch as the phthalaldehydes are available commercially. The phthalaldehyde can contain the —CHO groups in the ortho (1,2), meta (1,3) or para (1,4) positions on the aromatic $C_6$ ring. Illustrative but not limiting examples of the phthalaldehydes which can be employed are:

phthalaldehyde
isophthalaldehyde
terephthalaldehyde
methylethylphthalaldehyde
methylpropylphthalaldehyde
methylbutylphthalaldehyde
methylisooctylphthalaldehyde
methyldodecylphthalaldehyde
methyldiethylphthalaldehyde
methyltriethylphthalaldehyde
methyldipropylphthalaldehyde
methyltripropylphthalaldehyde
diethyldibutylphthalaldehyde
dimethyldiamylphthalaldehyde
Mono-, di-, tri- and tetra-methylphthalaldehyde
mono-, di-, tri- and tetra-ethylphthalaldehyde
mono-, di-, tri- and tetra-propylphthalaldehyde
mono-, di-, tri- and tetra-butylphthalaldehyde
mono-, di-, tri- and tetra-isobutylphthalaldehyde
mono- and di-tertiary butylphthalaldehyde
mono-, di-, tri- and tetra-amylphthalaldehyde
mono-, di-, tri- and tetra-isoamylphthalaldehyde
mono-, di-, tri- and tetra-hexylphthalaldehyde
mono-, di-, tri- and tetra-isohexylphthalaldehyde
mono-, di-, tri- and tetra-heptylphthalaldehyde
mono-, di-, tri- and tetra-octylphthalaldehyde
mono-, di-, tri- and tetra-isooctylphthalaldehyde
mono-, di-, tri- and tetra-nonylphthalaldehyde
mono-, di-, tri- and tetra-decylphthalaldehyde
mono-, di-, tri- and tetra-undecylphthalaldehyde
mono-, di-, tri- and tetra-dodecylphthalaldehyde
mono-, di-, tri- and tetra-methylisophthalaldehyde
mono-, di-, tri- and tetra-ethylisophthalaldehyde
mono-, di-, tri- and tetra-propylisophthalaldehyde
methylethylisophthalaldehyde
methylpropylisophthalaldehyde
methylbutylisophthalaldehyde
methylisooctylisophthalaldehyde
methyldodecylisophthalaldehyde
methyldiethylisophthalaldehyde
methyltriethylisophthalaldehyde
methyldipropylisophthalaldehyde
methyltripropylisophthalaldehyde
methyldibutylisophthalaldehyde
methyltributylisophthalaldehyde
methyldiamylisophthalaldehyde
methyltriamylisophthalaldehyde
diethyldibutylisophthalaldehyde
dimethyldiamylisophthalaldehyde
trimethyldodecylisophthalaldehyde
mono-, di-, tri- and tetra-butylisophthalaldehyde
mono-, di-, tri- and tetra-isobutylisophthalaldehyde
mono-, di- and tri-tertiary butylisophthalaldehyde
mono-, di-, tri- and tetra-amylisophthalaldehyde
mono-, di-, tri- and tetra-isoamylisophthalaldehyde
mono-, di-, tri- and tetra-hexylisophthalaldehyde
mono-, di-, tri- and tetra-isohexylisophthalaldehyde
mono-, di-, tri- and tetra-heptylisophthalaldehyde
mono-, di-, tri- and tetra-octylisophthalaldehyde
mono-, di-, tri- and tetra-nonylisophthalaldehyde
mono-, di-, tri- and tetra-decylisophthalaldehyde
mono-, di-, tri- and tetra-undecylisophthalaldehyde
mono-, di-, tri- and tetra-dodecylisophthalaldehyde
mono-, di-, tri- and tetra-methylterephthalaldehyde
mono-, di-, tri- and tetra-ethylterephthalaldehyde
mono-, di-, tri- and tetra-propylterephthalaldehyde
methylethylterephthalaldehyde
methylpropylterephthalaldehyde
methylbutylterephthalaldehyde
methylisooctylterephthalaldehyde
methyldodecylterephthalaldehyde
methyldiethylterephthalaldehyde
methyltriethylterephthalaldehyde
methyldipropylterephthalaldehyde
methyltripropylterephthalaldehyde
methyldibutylterephthalaldehyde
methyldiamylterephthalaldehyde
diethyldibutylterephthalaldehyde
dimethyldiamylterephthalaldehyde
mono-, di-, tri- and tetra-butylterephthalaldehyde
mono-, di-, tri- and tetra-isobutylterephthalaldehyde
mono- and di-tertiary butylterephthalaldehyde
mono-, di-, tri- and tetra-amylterephthalaldehyde
mono-, di-, tri- and tetra-isoamylterephthalaldehyde
mono-, di-, tri- and tetra-hexylterephthalaldehyde
mono-, di-, tri- and tetra-isohexylterephthalaldehyde
mono-, di-, tri- and tetra-heptylterephthalaldehyde
mono-, di-, tri- and tetra-octylterephthalaldehyde
mono-, di-, tri- and tetra-isooctylterephthalaldehyde
mono-, di-, tri- and tetra-nonylterephthalaldehyde
mono-, di-, tri- and tetra-decylterephthalaldehyde
mono-, di-, tri- and tetra-undecylterephthalaldehyde
mono-, di-, tri- and tetra-dodecylterephthalaldheyde The dicyclopentadienyliron derivatives of the present invention are solid polymers having average molecular weights of about 1,000 to 10,000 or higher. While the chemical structure of the polymers has not been positively determined, infrared analysis of the products indicates a high degree of cross-linking. The polymers are stable at temperatures in excess of 100° C. and can be readily prepared and stored without special precautions. The polymers can be pressure molded and, in general, can be classified as semi-conductors.

The polymers of the invention can be prepared in any convenient way. For example, the dicyclopentadienyliron compound and the phthalaldehyde can be admixed with a suitable condensing agent such as zinc chloride or other Lewis acid such as aluminum chloride, ferric chloride, antimony penta-chloride and the like. The mixture is then heated at about 100° to about 200° C. under nitrogen with stirring until no further reaction is evidenced. The molar ratio of the dicyclopentadienyliron compound to the phthalaldehyde can be within the range of about 1:10 to about 10.1. The polymerization product thus obtained, in general, consists of a benzene-soluble portion and a benzene-insoluble portion. The benzene-soluble portion has a lower melting point than the benzene insoluble portion. Purification of the polymerization product is effected by washing the product with hot (70° C.) benzene. The benzene is removed from the benzene-soluble product by evaporation. After evaporation of the benzene from the benzene-soluble product, the product is heated to sublime any unreacted dicyclopentadienyliron compound. The product is then dissolved in benzene, precipitated with petroleum ether and dried. After washing the polymerization product with hot benzene to remove the benzene-soluble product, the residue or the benzene-insoluble product is washed with hot (70° C.) 10% aqueous hydrochloric acid, water and acetone.

Other methods of preparing the polymers of the invention including the use of the high boiling solvent and/or a sealed reaction vessel can also be employed.

The following examples will illustrate one method employed in preparing dicyclopentadienyliron derivatives of the invention.

EXAMPLE I 37 grams (0.2 mole) of ferrocene, 6.7 grams (0.05 mole) of terephthalaldehyde and 20.4 grams (0.15 mole) or zinc chloride are thoroughly mixed and ground to a fine powder. The mixture is placed in a glass flask and heated (under nitrogen) by means of an oil bath at 200° C. for 30 minutes. The heating turns the powery mixture into a black, sticky mass. The mass is allowed to cool and then extracted with hot (70° C.) benzene to give an extract portion and a benzene-insoluble residue. The extract portion is heated to remove the benzene by evaporation. After the benzene is removed, the residue is heated to sublime unreacted ferrocene. The heated residue is then dissolved in benzene and precipitated from the benzene solution by petroleum ether. The precipitated product upon drying is a fine yellow powder (5.1 grams) having a melting point of about 120° C. The product has an average molecular weight of about 4570 and has an elemental analysis by weight of 70.86% carbon, 5.29% hydrogen and 21.30% iron. The infrared spectrum of the yellow powder in Nujol has bands at 3100, 1105, 1040, 1030, 1000, 930, 820, 730 and 675 cm.$^{-1}$. There are no carbonyl bands.

The benzene-insoluble residue (23 grams) is washed with hot (70° C.) 10% aqueous hydrochloric acid, water and acetone. The product upon drying is a dark brown powder which does not melt when heated to 380° C. Elemental analysis of the product shows it to contain 73.01% carbon, 5.50% hydrogen, 11.98% iron and 1.32% chlorine. The infrared spectrum of the product in Nujol has bands at 3100, 1700 (carbonyl), 1600, 1210, 1180, 1105, 1040–1020, 1000, 820, 730 and 675 cm.$^{-1}$.

EXAMPLE II 37 grams (0.2 mole) of ferrocene, 9.5 grams (0.05 mole) of tetramethylterephthalaldehyde and 20.4 grams (0.15 mole) of zinc chloride are thoroughly mixed and ground to a finer powder. The mixture is placed in a glass flask and heated (under nitrogen) by means of an oil bath at 200° C. for ten minutes. The heating turns the powdery mixture into a black sticky mass. The mass is allowed to cool and then extracted with hot (70° C.) benzene to give an extract portion and a benzene-insoluble residue. The extract portion is heated to remove the benzene by evaporation. After the benzene is removed, the residue is heated to sublime unreacted ferrocene. The heated residue is then dissolved in benzene and precipitated from the benzene solution by petroleum ether. The precipited product upon drying is a fine yellow powder (1.0 gram) having a melting point above 220° C. The product has an average molecular weight of about 1250 and has an elemental analysis of 72.77% carbon, 6.18% hydrogen and 15.49% iron. The infrared spectrum of the yellow powder in Nujol has bands at 3100, 1680 (carbonyl), 1280, 1105, 1060–1020, 1000, 820 and 720 cm.$^{-1}$.

The benzene-insoluble residue (9.0 grams) is washed with hot (70° C.) 10% aqueous hydrochloric acid, water and methanol. The product upon drying is a brown powder which does not melt when heated at 300° C. Elemental analysis of the product shows it to contain 74.65% carbon, 6.56% hydrogen, 9.39% iron and 3.23% chlorine. The infrared spectrum of the product in Nujol has bands at 3100, 1680 (carbonyl) 1105, 1040–1020, 820 and 720 cm.$^{-1}$.

The ferrocene-terephthalaldehyde polymers of the invention are suitable in forming pressure-molded products Semi-conductors are useful in thermoelectric devices, memory devices, ion exchange materials and the like. The pressure-molded ferrocene-terephthalaldehyde benzene-insoluble product of Example I has a resistivity at 25° C. of $4.7 \times 10^6$ ohm-centimeters.

While our invention has been described with reference to various specific examples and embodiments, it will be understood that the invention is not limited to such examples and embodiments and may be variously practiced within the scope of the claims hereinafter made.

We claim:

1. The cross-linked condensation product obtained by heating at about 100° to about 200° C. in the presence of an acidic condensing agent (1) a dicyclopentadienyliron compound having the formula

in which $C_5H_{5-n}$ is a cyclopentadienyl radical, R and R' are selected from the group consisting of hydrogen, alkyl and aralkyl radicals containing 1 to 8 carbon atoms and $n$ is an integer of 0 to 4 and (2) a phthalaldehyde having the formula

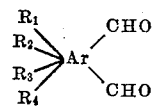

where Ar is an aromatic $C_6$ ring and $R_1$, $R_2$, $R_3$ and $R_4$ are selected from the group consisting of hydrogen and alkyl radicals containing 1 to 12 carbon atoms, the molar ratio of (1) to (2) being within the range of about 1:10 to about 10:1.

2. The condensation product of claim 1 wherein the dicyclopentadienyliron compound is ferrocene.

3. The condensation product of claim 1 wherein the phthalaldehyde is phthalaldehyde.

4. The condensation product of claim 1 wherein the phthalaldehyde is isophthalaldehyde.

5. The condensation product of claim 1 wherein the phthalaldehyde is terephthalaldehyde.

6. The condensation product of claim 1 wherein the phthalaldehyde is tetramethylterephthalaldehyde.

7. A condensation product obtained by heating ferrocene and terephthalaldehyde at about 200° C. in the presence of an acidic condensing agent wherein the molar ratio of ferrocene to terephthalaldehyde is about 4:1.

8. A condensation product obtained by heating ferrocene and tetramethylterephthalaldehyde at about 200° C. in the presence of an acidic condensing agent wherein the molar ratio of ferrocene to tetramethylterephthalaldehyde is about 4:1.

References Cited

UNITED STATES PATENTS 3,281,394  10/1966  Katon _____ 260—67
3,341,459   9/1967  Neuse _____ 260—67

OTHER REFERENCES

Lenz et al., Journal of Organic Chemistry, vol. 25, May 1960, pp. 813–817.

Chemical Abstracts, vol. 55, 1961.

WILLIAM H. SHORT, Primary Examiner.

L. M. PHYMES, Assistant Examiner.

U.S. Cl. X.R.

260—2.1

PO-1050
(5/69)

UNITED STATES PATENT OFFICE
CERTIFICATE OF CORRECTION

Patent No. 3,448,082            Dated June 3, 1969

Inventor(s) Joseph J. McGrath and Ilgvars J. Spilners

It is certified that error appears in the above-identified patent and that said Letters Patent are hereby corrected as shown below:

Column 1, line 64, that portion of the formula reading "$C_5H_{5-n}R_n)Fe)$" should read -- $C_5H_{5-n}R_n)Fe($ --.

Column 3, line 45, "preparations" should read -- preparation --
line 67, "Mono-," should read -- mono-, --.

Column 5, line 16, "10.1" should read -- 10:1 --;
line 45, "powery" should read -- powdery --.

Column 7, in the Neuse reference "3,341,459" should read -- 3,341,495 --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents